July 30, 1935.                R. BROWN ET AL                2,009,760
                              MOISTURE INDICATOR
                              Filed Jan. 10, 1929          2 Sheets-Sheet 1
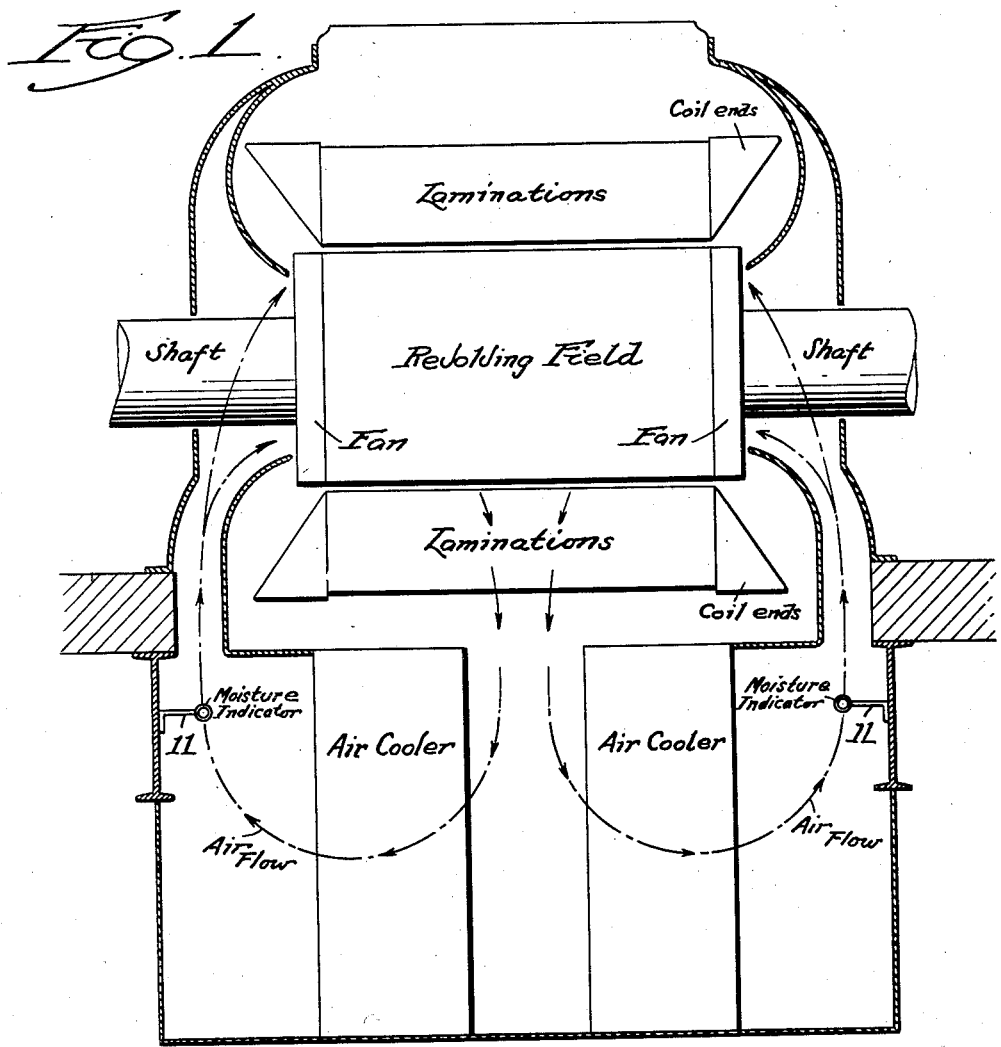
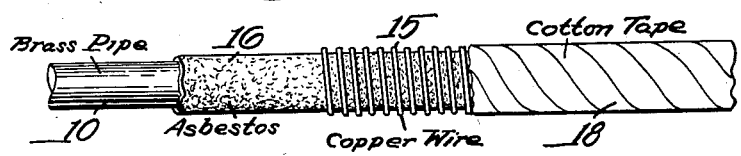

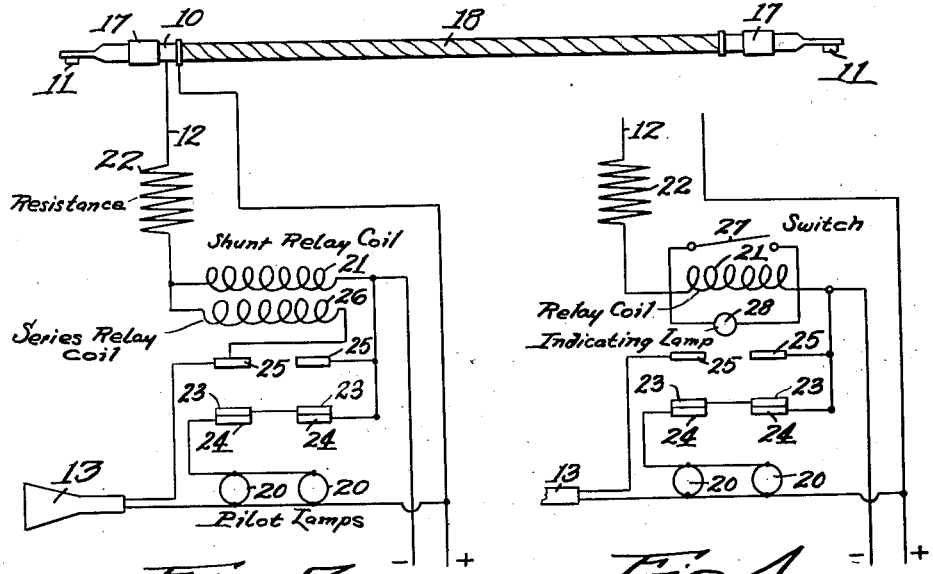
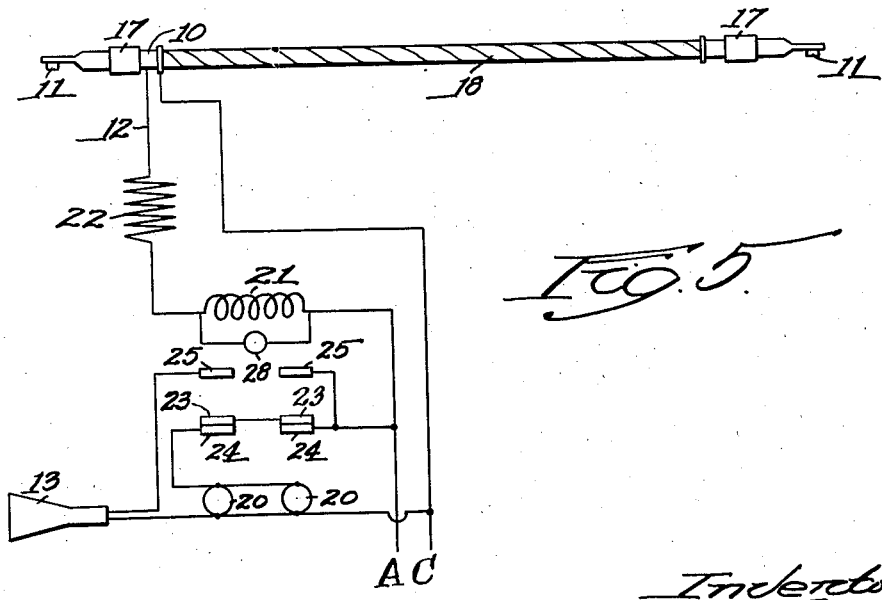

Patented July 30, 1935

2,009,760

UNITED STATES PATENT OFFICE 2,009,760

MOISTURE INDICATOR

Richard Brown, Auburndale, and Edwin H. Perry, Worcester, Mass.

Application January 10, 1929, Serial No. 331,585

1 Claim. (Cl. 177—311)

This invention relates to an apparatus for indicating danger of short circuiting due to the accumulation of moisture in a generator supplied with a surface air cooler, or washer, and is an improvement over that shown in our abandoned application, Serial No. 711,031, filed May 5, 1924.

The principal object of the present invention is to provide means whereby the indicator can be dried out by the current passing through it without danger. The invention also involves improvements in the arrangement of the parts to keep the current on for a period to insure the drying out of the indicator until no current will flow through it.

Reference is to be had to the accompanying drawings, in which

Fig. 1 is a central, vertical, sectional view of a large alternator provided with a surface air cooler to which this invention is particularly adapted;

Fig. 2 is a side view of the indicator itself;

Fig. 3 is a wiring diagram showing how it may be dried out automatically;

Fig. 4 is a similar view of a modification in which the drying action is not automatic, and Fig. 5 is a similar view of a modification for an alternating current.

The invention is shown as applied to an alternator in Fig. 1. We shall not describe the alternator, but the drawings are lettered to show the different parts.

The fans direct currents of air inwardly down through the center, as indicated by the dotted lines, through the air coolers which are provided with pipes for conducting cold water through them. The air is cooled and drawn up at the ends around the shaft back through the machine to cool the same. This is the ordinary construction. Short circuiting will result if much moisture gets into these air currents.

We locate a pair of moisture indicators at points in the currents of air just described. These indicators are so located, therefore, that the moisture in the air affects them before it can enter the machine and, as the moisture increases, the indicators will eventually give the signal before any danger point is reached.

Each indicator comprises a brass pipe 10 constituting a conductor mounted on brackets 11 supported by the beams or in any other convenient way. This brass pipe is covered by a continuous layer 16 of porous material, as asbestos fibre and the end of the pipe is connected by a wire 12 to a source of power. The other terminal is connected with a conductor in the form of a coil of wire 15 wound on said layer of asbestos 16 with which the pipe 10 is covered. The coil of wire 15 is a single coil with the coils spaced apart, preferably, extending along the pipe to any desired distance but not, of course, capable of coming into contact with the pipe anywhere. We have also shown the ends of the pipe 10 as provided with fibre insulators 17 so that there is no danger of the pipe 10 coming into contact with supporting brackets at either end. We also preferably wind layers of cotton tape 18 on the outside of the coil 15 so as to protect the asbestos.

When the asbestos is moistened by the presence of air having 100% or more relative humidity it will allow a current to flow through the circuit, that being the only insulator in the way. Its insulating properties are neutralized by the moisture. We have discovered that this absorption element will stand all the current it will take when connected electrically, when either direct or alternating currents are employed, whether the asbestos is soaking wet or any degree of wetness between soaking wet and bone dry. Further it becomes dried out by virtue of the current flowing through it due to its wetness and if allowed to dry it will become so thoroughly dried out that no further appreciable current will flow through it. We speak now of a source of current maintained at 110 volts or thereabouts.

In Fig. 3 we have shown a diagram based on the above principle for the purpose of carrying it out for the purpose of drying the asbestos without danger, blowing the horn 13 or other alarm device, and operating the pilot lamps 20 at the proper time. The source of power is indicated by the plus and minus signs. One main goes directly to the collar which is connected with the wire 15. The other one is connected with the pipe 10 through a shunt relay coil 21 and a current limiting resistance 22 and wire 12 which has been mentioned. This resistance 22 may be used for the purpose of preventing a sudden flow of high current under peculiar conditions, which do not occur frequently. This coil 21, when the current is flowing, is arranged to operate a pair of contacts 23 from a neutral position or a position in contact with a pair of contacts 24 to a position in which they engage a pair of contacts 25. In the latter case the current is divided and part of it goes through the series relay coil 26 to the other side of the line. Part of this current in this case goes from the plus side through the signal 13, contacts 25 and 23 and right across to the minus side. When the asbestos dries out so the current cannot flow through the coil 21, the contacts 23 will drop and there will be only a small current through the coil 26, of course. Neither will there be much through the horn 13 but there will be a current from the plus side of the line to the pilot lamps 20, contacts 24 and 23 to the minus side of the line. The coil 26 serves as a parallel path to the coil 21 and provides a stick circuit for the contacts 23 so that the relay may be kept energized by a smaller current than was required originally to sound the alarm. This increases the conductance and therefore increases the drying current. The current flowing through the coil 26 then draws the contacts 23 back into engagement with the contacts 25.

In this way the moisture indicating element is in combination with an electric circuit comprising a switch or relay or both so that the element will be connected directly across the source of power automatically when it is wet in order to dry it out. At that time the signal will be given and the pilot lamps will go out, but when the device is in the proper working order the pilot lamps will go on again, showing that the unit is normal and ready to act again.

This can be made to be operated manually as shown in Fig. 4 and the coil 21 will operate the contacts 23 in the same way as before but in this case a switch or push button 27 will have to be closed to cut out the coil 21 and dim the indicating lamp 28 to more quickly dry the asbestos.

The same results can be made in an alternating current system, and we have shown a diagram for that in Fig 5 in which most of the parts are the same and the coil 21 operates the contacts 23 in the same way. A transformer or relay or both are used with any other conductors so proportioned that when the indicating element becomes slightly wet, sufficient current will flow to light the lamp 28 to close the contacts 25 and affect a voltmeter or ammeter or other instrument, as may be desired. Upon increasing wetness induction will cause an increase of current to flow, due to the saturation of the iron magnetic circuit which current will dry out the element automatically.

In any of these cases the asbestos insulating material will conduct a current when it is sufficiently wet and will be dried out without danger of injuring it. As a matter of fact we have found that the use of cloth or paper of any kind in place of the asbestos covering is all right for operation of the device once but it cannot be dried out by any means that we have been able to discover without puncturing it or injuring it to such an extent that it cannot be depended upon to work again.

The operation of the device is very simple. Normally with no moisture present current flows from minus through coils 21 and 26, signal 13 to plus, but this current due to the resistance of this path is of insufficient value to operate the signal device and to lift the armature 23; also current flows from minus through contacts 24 and bridge 23 through the pilot lamps and to plus, thus operating the pilot lamps; when moisture occurs current flows through from plus to wire 15, asbestos, rod 10, resistance 22, coil 21 to minus, this current being of such strength as to lift armature 23 and bridge the contacts 25 connecting the signal device 13 directly across the line and the coil 26 is connected in parallel with the coil 21; under this condition more current flows than before and the asbestos is dried more quickly; when the asbestos is dried out the current flow through the coils is cut down to its original value and the armature 23 is dropped into engagement with the contacts 24. This will illuminate or sound the signal, as the case may be, and the operator can then stop the machine before any danger is done. This is a very simple, inexpensive and effective way of ensuring the machine against short circuiting from this cause.

The asbestos will be dried out automatically in the form shown in Figs. 3 and 5 and by simply pressing the button in the form shown in Fig. 4 with either alternating or direct current. When dried out the current will stop flowing and the parts will return to their normal safe position and indicate by their lights 20 that everything is in working order and that there is no danger to the generator from moisture in the coils. Thus the device is ready to work over and over as many times as may be required.

Although we have illustrated and described only three forms of the invention and shown it as applied to only one form of electric machine, we are aware of the fact that other modifications can be made therein by any person skilled in the art, and that it can be applied to other generators or machines without departing from the scope of the invention as expressed in the claim. Therefore, we do not wish to be limited to all the details of construction herein shown and described, but what we do claim is:—

The combination of two conductors located in a path of air currents, a continuous layer of absorbent asbestos fibre filling the space between the conductors, whereby when the asbestos is moistened a path for a current of electricity will be established through it from one conductor to the other and the asbestos will be dried out thereby, a source of electric current, one conductor being connected to one terminal of said source, a shunt relay coil and a series relay coil, one terminal of each coil being connected to the other conductor, a pair of separated front contacts, one of said contacts being connected to the other terminal of said shunt coil and to the other terminal of said source of current, the other contact being connected to the other terminal of said series coil and to one terminal of a signal device, the other terminal of the signal device being connected to said first terminal of said source of current, a pair of separated back contacts for said coils, one of said back contacts connected to said other terminal of said source and the other back contact being connected to one terminal of a pilot lamp, the other terminal of which is connected to said first terminal of said source of current, a bridging contact member for said pairs of contacts, means movably mounting said bridging member so that it engages said front pair of contacts when the shunt coil is energized due to a wet condition of the asbestos, and the back pair of contacts when the asbestos is dry, the current passing through the coils and signal device in the latter condition being of insufficient value to lift the bridging member and to operate the signal due to the selected resistance of the elements.

RICHARD BROWN.
EDWIN H. PERRY.